Jan. 10, 1956   J. E. LEGLER   2,730,002
TOY MUSICAL INSTRUMENTS
Filed Sept. 12, 1952   2 Sheets-Sheet 1
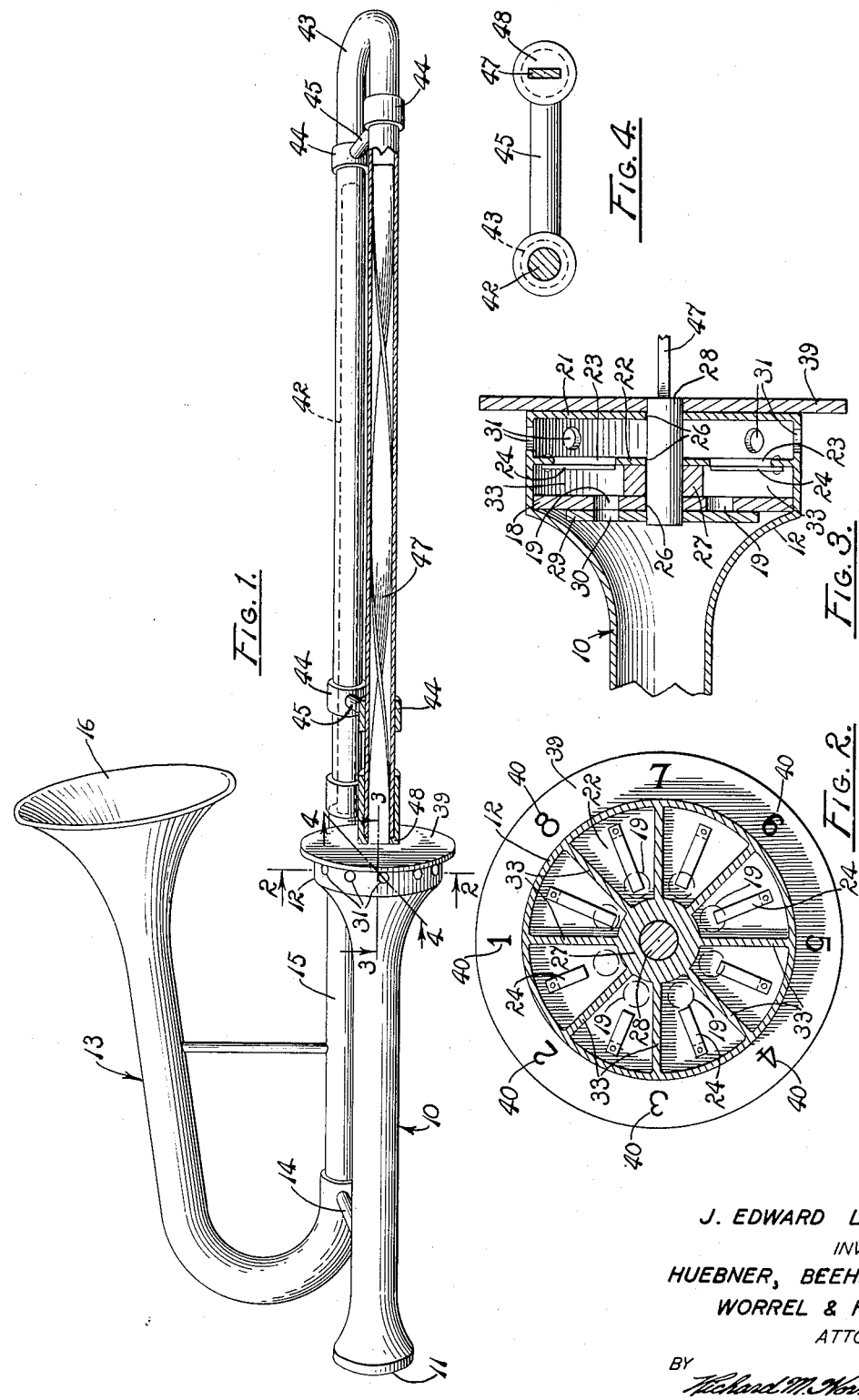
J. EDWARD LEGLER
INVENTOR
HUEBNER, BEEHLER,
WORREL & HERZIG
ATTORNEYS
BY
Richard M. Worrel Jan. 10, 1956    J. E. LEGLER    2,730,002
TOY MUSICAL INSTRUMENTS Filed Sept. 12, 1952    2 Sheets-Sheet 2

J. EDWARD LEGLER
INVENTOR

HUEBNER, BEEHLER,
WORREL & HERZIG
ATTORNEYS

United States Patent Office 2,730,002
Patented Jan. 10, 1956

2,730,002
TOY MUSICAL INSTRUMENTS

J. Edward Legler, Fresno, Calif.

Application September 12, 1952, Serial No. 309,187

7 Claims. (Cl. 84—375)

The present invention relates to musical instruments and more particularly to toy musical instruments that are easily operated and educational to employ.

The educational value of musical toys has long been recognized but has not been as fully exploited as desired. Some such instruments are difficult to employ and thus do not readily provide the user with initial satisfactory experiences. Others are quite simple but provide such a narrow range of expression as to be limited in their application and of little prolonged interest to the user. For example, the simpler toy instruments have frequently provided only a single tone and thus have been of little if any educational value. Others have provided means for producing a variety of tones but have been unduly complex or difficult to manipulate so as to attain the precise tones and sequential arrangements desired.

An object of the present invention is to provide an improved toy musical instrument which is easy to operate and educational to employ.

Another object is to provide a toy instrument conveniently manipulated to attain selected tones of accurate pitch.

Another object is to provide an instrument of the character described having a visual aid for the prompt and accurate selection of tones desired.

Another object is to provide a toy musical instrument having the general appearance of a trombone and provision for precise tone selection.

Other objects are to provide improved elements and arrangements thereof in a device of the character and for the purposes set forth that is economical to produce, durable and fully effective in accomplishing its intended purposes.

Still further objects and advantages will become apparent in the subsequent description in the specification.

In the drawing:

Fig. 1 is a side elevation of a simulated trombone toy musical instrument having a portion of the slide thereof removed to reveal a pitch control bar employed therein.

Fig. 2 is a somewhat enlarged section taken on line 2—2 of Fig. 1.

Fig. 3 is a somewhat enlarged fragmentary section taken on line 3—3 of Fig. 1.

Fig. 4 is a somewhat enlarged section taken on line 4—4 of Fig. 1.

Fig. 5 is a section similar to Fig. 2 and can be visualized as taken in the same position on the modified instrument as that shown by line 2—2 in Fig. 1.

Figure 5:
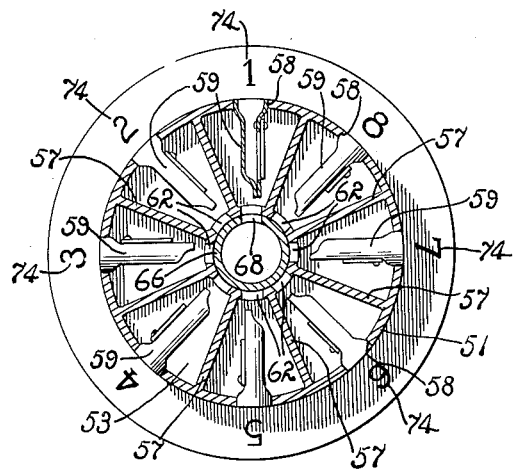
Fig. 5 is a section of a second form of the instrument of the present invention which has the external appearance of that shown in Fig. 1 but a modified tone producing and control mechanism.

Referring in greater detail to the drawings:

A simulated trombone embodiment of the present invention is shown in Fig. 1 having a tubular member 10 providing a mouthpiece 11 at one end and a somewhat enlarged, substantially cylindrical, bell 12 in the opposite end thereof. A return bent horn 13 is rigidly mounted on the tubular member 10 by means of a pair of parallel struts 14 in the manner well known in trombones. The horn has a straight tubular portion 15 in parallel relation to the tubular member 10 and is return bent adjacent to the mouthpiece 11 and provides an open bell 16.

A circular partition 18, best shown in Fig. 3, is mounted transversely in the cylindrical bell 12 in closing relation to the tubular member. The partition provides a plurality of substantially equally spaced openings 19 in a circular arrangement concentric to the bell.

A circular wall 21 is mounted in the end of the cylindrical bell 12 and in closing relation thereto. A circular division plate 22 is mounted in the cylindrical bell intermediate the partition and the wall and provides a plurality of radially disposed slots 23 therethrough. The slots are individually aligned with the openings 19 and a reed 24 mounted on the division plate in overlaying relation to each of the slots. As shown in Fig. 2, the reeds are of different lengths so as to produce a plurality of predetermined tones when vibrated.

Central bores 26 are provided in alignment in the partition 18, the division plate 22, and wall 21. A spacing bearing 27 is preferably mounted between the partition and the division plate. A rod 28 is rotatably mounted in the bores of the partition, plate, wall, and bearing, and provides an inner end disposed within the tubular member 10 and an outer end outwardly extended from the wall. A circular valve plate 29 is mounted on the inner end of the rod against the partition 18 in overlaying relation to the openings 19. A port 30 is provided in the valve plate in a position alignable with the openings 19. It will be apparent that upon blowing in the mouthpiece 11, air will be directed by the port 30 through any opening 19 with which it is aligned so as to direct air operatively against the opening's corresponding reed 24. To exhaust the air from the cylindrical bell 12, exhaust ports 31 are provided in said bell.

As shown in Fig. 2, the reeds 24, slots 23, and openings 19 are substantially equally spaced and radial partitions 33 interconnect the bearing 27 and the cylindrical bell 12 and the partition 18 and the division plate 22 intermediate the corresponding openings 19 and slots 23 and reeds 24 aligned therewith. The radial partitions shield the reeds 24 from air directed through all of the openings 19 except their respective openings.

A circular dial 39 is mounted on the outer end of the rod 28 and radially extended from the bell 12. The dial provides position indicating numerals 40 by reference to which a user may speedily and precisely position the valve plate 29 in tone selection.

A rod 42 is longitudinally extended from the tubular portion 15 of the horn 13. A U-shaped slide 43 has a leg telescopically fitted over the rod 42 for slidable movement longitudinally thereof and a second leg aligned with the rod 28. As shown, the slide is tubular and is preferably braced by rings 44 mounted in adjacent relation on the opposite legs interconnected by tie rods 45.

An elongated, substantially transversely flat, helicoidal bar 47 has an end connected concentrically to the rod 28 and is endwardly extended therefrom within the second leg of the slide 43. A driving nut 48 is fixedly mounted on the end of the second leg of the slide disposed toward the dial 39 and has a slot therein which slidably receives the bar.

Operation

The operation of the first form of the present invention just described is believed to be clearly apparent and is briefly summarized at this point. A child or other person employing the toy instrument blows into the mouthpiece 21 which simply functions as an air intake for the tubular member 10. By slidably positioning the slide 43 on the rod 42 and thus drawing the driving nut 48 longitudinally along the bar 47, the rod 42 is rotationally positioned in the partition 18, wall 21, and plate 22. By visual reference to the numeral 40 on the dial 39, a user can quickly and easily align the port 30 in the valve plate 29 with successively selected openings 19 actuating the reeds 24 in corresponding sequence.

Every reed 24 actuated produces its characteristic tone and thus even the novice avoids all fractionally intermediate and distorted tones that are so discouraging to the beginner. The user need only plan and execute sequential selection of the tones and attain proper timing to achieve pleasing results.

*Second form*

Figure 6:
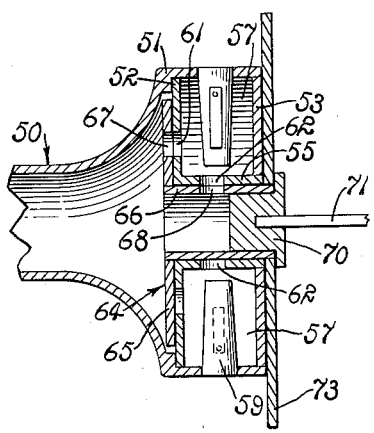
Fig. 6 is a section similar to that shown in Fig. 3 but representing the modified structure of Fig. 5.

The second form of the present invention has the external appearance of the instrument shown in Fig. 1 and differs from that described only in the tone producing and selection mechanism shown in Figs. 5 and 6. The second form of the instrument employs a tubular member 50, similar to the tubular member 10, and only fragmentarily shown in Figs. 5 and 6. The tubular member provides a somewhat enlarged cylindrical bell 51 similar to the bell 12 already described.

A circular partition 52 is mounted in the bell 51 and provides a bore concentrically therethrough. A circular wall 53 is mounted in the end of the bell 51 and also provides a concentric bore. A sleeve 55 is fixedly mounted in the bores of the partition and the wall.

A plurality of radial partitions 57 interconnect the sleeve 55 and the cylindrical bell 51 and the partition 52 of the wall 53 in substantially equally spaced relation. An exhaust port 58 is provided in the bell 51 intermediate each of the partitions. A tubular reed member 59 of well known form is conveniently mounted in each of the compartments defined by the radial partitions 57 by extension of the same into the exhaust ports 58. An opening 61 is formed in the partition 52 intermediate each pair of radial adjacent partitions 57. The openings are preferably in a circular arrangement concentric to the partition. Similarly, an opening 62 is provided radially through the sleeve 55 intermediate each pair of adjacent radial partitions. The openings 62 are preferably in a common plane normal to the sleeve 55 and being in the cylindrical sleeve are, of course, in a circular arrangement in their plane.

A valve plate 64 having a circular portion 65 and a cylindrical portion 66 is rotatably mounted by engagement of the cylindrical portion in the sleeve 55 with the valve plate 64 against the partition 52. A port 67 is provided in the circular portion of the valve plate in a position successively alignable with the openings 61 and a port 68 is provided in the cylindrical portion successively alignable with the openings 62. The ports 67 and 68 are so arranged that they register with the openings 61 and 62 for the same compartment defined by the radial partitions 57. To avoid loss of air and to provide a valve plate positioning means similar to the rod 42, a plug 70 is mounted in the outer end of the cylindrical portion 66. A substantially transversely flat helicoidal bar 71 similar to that shown at 47 in Figs. 1, 3, and 4 has an end connected to the plug and is rotatably positioned in the manner already described in connection with the first form of the invention.

A dial 73 having positioning identifying numerals 74 thereon is mounted on the outer end of the cylindrical portion 66 of the valve plate 64 and radially extended beyond the bell 51.

The second form of the present invention operates in essentially the same manner as the first form. Rotatable positioning of the plug 70 correspondingly rotatably positions the valve plate 64 to align the ports 67 and 68 with selected openings 61 and 62. The reed members 59 are selected so as to produce distinctive tones suited by the successive selection thereof to produce a melody. The reed members 59 are actuated by air passed through both of the openings 61 and 62 aligned with the ports 67 and 68. Such double supply of actuating air is desirable but not necessary. It will be obvious that either source of air may be utilized to the exclusion of the other so that in actual construction of the second form of the instrument, either of the set of openings 61 or 62 may be omitted and the corresponding port 67 or 68, likewise omitted.

The instruments of the present invention are of simple form, economical to construct, and durable. They are conveniently formed of plastic, metal, or other suitable material. Both forms of the instrument provide visual aid to the proper selection of tones, avoid the inadvertent production of undesirable intermediate tones, are simple to operate, and aid even the child user in the composition and performance of simple but pleasing melodies and the development of proper time appreciation in music.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A toy musical instrument comprising a tubular member, a partition mounted in the tubular member in closing relation thereto having a plurality of openings therethrough, valve means rotatably mounted in the tubular member in overlaying relation to the openings in the partition having a port therein registrable with the openings in response to adjustable positioning of the valve means in the tubular member, air operative sound means positioned for individual actuation by air directed through the openings in the partition, means mounted in the tubular member shielding each of the sound means from air directed through all but their respective openings in the partition, a control member mounted on the tubular member movable axially of the rotatable valve means, and control means interconnecting the control member and the valve means rotatably positioning the valve means in response to movement of the control member in spaced relation thereto, said control means including a driving nut mounted on one of the elements interconnected thereby and an elongated helicoid bar mounted on the opposite element interconnected thereby and slidably extended through the driving nut.

2. In a toy musical instrument, the combination of a tubular member having a mouthpiece at one end and a bell at the opposite end, a partition mounted in the bell in closing relation thereto and having a plurality of openings therethrough in a circular arrangement, valve means rotatably mounted in the bell concentrically of the arrangement of the openings in the partition and in overlaying relation thereto having a port therein registrable with the openings in the partition, air operative sound means mounted in the bell individually in operative relation to the openings in the partition, a control member mounted on the tubular member movable axially of the rotatable valve means, and control means interconnecting the control member and the valve means rotatably positioning the valve means in response to movement of the control member in spaced relation thereto, said control means including a driving nut mounted on one of the elements interconnected thereby and an elongated helicoid bar mounted on the opposite element interconnected thereby and slidably extended through the driving nut.

3. A toy musical instrument comprising a tubular member having a mouthpiece at one end and a somewhat enlarged cylindrical opposite end, a circular partition mounted in said cylindrical opposite end in closing relation to the tubular member and having a plurality of openings therethrough in a substantially circular arrangement, a circular wall mounted in the end of the cylindrical portion in spaced relation to the partition, a circular division plate mounted in the cylindrical portion intermediate the partition and the wall having slots radially disposed therein individually aligned with the openings in the partition, reeds mounted on the division plate in overlaying relation to the openings therein, radial walls interconnecting the partition intermediate the openings therein and the division plate intermediate corresponding slots therein, a rod rotatably mounted concentrically in the partition, the wall and the plate having an inner end disposed within the tubular member and an opposite manipulating end disposed outwardly from the wall, a circular valve plate mounted on the inner end of the rod against the partition in overlaying relation to the openings therein, the valve plate having a port therein alignable with the openings in the partition, a helicoid bar connected to the rod and axially extended therefrom, and a driving nut slidably mounted on the bar whereby movement of the nut along the bar rotates the bar, the rod and the valve plate.

4. A toy musical instrument comprising a tubular member having a mouthpiece at one end and a somewhat enlarged cylindrical opposite end, a circular partition mounted in said cylindrical opposite end having a bore concentrically therein, a circular wall mounted in closing relation to the end of the cylindrical portion in spaced relation to the partition and having a bore concentrically therein, a hollow sleeve fixedly mounted in the bores of the partition and the wall having a plurality of radially disposed openings therein between the partition and the wall, radial partitions each interconnecting the sleeve and the cylindrical portion of the tubular member and the partition and the wall intermediate the openings in the sleeve, the cylindrical portion of the tubular member having radially disposed openings therein intermediate the radial partitions, reed members mounted to said openings of the cylindrical portion, a cylindrical valve member having a closed outer end rotatably mounted in the sleeve and having a port radially therein registrable with the openings in the sleeve, a helicoid bar having driving connection to the valve member, and a driving nut slidably mounted on the bar whereby reciprocal movement of the nut longitudinally of the slide bar rotates the bar and the valve member.

5. In a simulated trombone toy instrument, a tube having a mouthpiece at one end and a bell at the opposite end; a plurality of air operative sound means mounted in the bell; rotatable valve means mounted in the bell positionable to direct air from the mouthpiece to selected sound means; a return bent horn mounted on the tube having a straight portion in substantially parallel relation thereto; a substantially U-shaped slide having a leg member slidably mounted on the straight portion of the horn and an opposite leg member aligned with the tube; and control means interconnecting the leg member aligned with the tube and the valve means rotatably positioning the valve means in response to slidable positioning of the slide, said control means comprising a driving nut mounted on one of the members interconnected thereby, and an elongated helicoid bar mounted on the opposite member and slidably extended through the driving nut.

6. In a simulated trombone toy instrument, the combination of a tubular member having a mouthpiece at one end and a bell at the opposite end, a return bent horn member rigidly mounted on the tubular member and providing a straight portion in substantially parallel relation to the tubular member, a partition mounted in the bell of the tubular member in closing relation thereto and having a plurality of openings therethrough in a circular arrangement, a valve plate rotatably mounted in the bell concentrically of the arrangement of the openings in the partition and in overlaying relation thereto having a port therein selectively registrable with the openings in the partition, air operative sound means mounted in the bell in operative relation to the openings in the partition, a substantially U-shaped tubular slide having a first leg slidably mounted on the straight portion of the horn member and a second leg aligned with the tubular member, an elongated transversely substantially flat helicoid bar connected rigidly concentrically to the valve plate and extended into the second leg of the slide, and a driving nut rigidly mounted in said second leg having a slot slidably receiving the helicoid bar thereto.

7. In a toy musical instrument having a plurality of sound means of differing pitch, rotatable means for selectively actuating the sound means, and control means connected to the rotatable means for rotatably positioning said means, the control means comprising an elongated helicoid bar element, and a driving nut element slidably mounted on the bar element, one of said elements being mounted on the rotatable means for unitary movement therewith and the other element being movable rectilinearly toward and from the rotatable means.

References Cited in the file of this patent

UNITED STATES PATENTS

| 128,591 | Clarke | July 2, 1872 |
| 329,420 | Wier | Oct. 27, 1885 |
| 569,777 | Williams | Oct. 20, 1896 |
| 2,504,547 | Legler | Apr. 18, 1950 |
| 2,508,423 | Robbins | May 23, 1950 |

FOREIGN PATENTS

| 73,930 | Germany | Mar. 14, 1894 |
| 591,862 | France | Apr. 18, 1925 |
| 606,586 | France | Mar. 12, 1926 |